US008727456B1

(12) United States Patent
Bullock et al.

(10) Patent No.: US 8,727,456 B1
(45) Date of Patent: May 20, 2014

(54) DRAW OUT CONTROL COMPARTMENT

(75) Inventors: Scott A. Bullock, Bristol, VA (US);
Garry F. Raines, Bristol, TN (US)

(73) Assignee: Electro-Mechanical Corporation, Bristol, VA (US)

( * ) Notice: Subject to any disclaimer, the term of this patent is extended or adjusted under 35 U.S.C. 154(b) by 0 days.

(21) Appl. No.: 13/414,250

(22) Filed: Mar. 7, 2012

Related U.S. Application Data

(60) Provisional application No. 61/451,390, filed on Mar. 10, 2011, provisional application No. 61/451,407, filed on Mar. 10, 2011, provisional application No. 61/451,416, filed on Mar. 10, 2011.

(51) Int. Cl.
*H05K 5/00* (2006.01)

(52) U.S. Cl.
USPC ........................................ 312/223.2; 361/727

(58) Field of Classification Search
USPC ........... 312/330.1, 223.1, 292, 298, 301, 302, 312/303, 223.2; 361/608, 609, 614, 615, 361/664, 665, 666, 667, 724, 725, 726, 727
See application file for complete search history.

(56) References Cited

U.S. PATENT DOCUMENTS

| | | | | | |
|---|---|---|---|---|---|
| 701,449 | A | * | 6/1902 | Yawman | 312/303 |
| 1,527,896 | A | * | 2/1925 | Miller | 174/542 |
| 2,173,101 | A | * | 9/1939 | Fiedler | 361/608 |
| 2,238,033 | A | * | 4/1941 | Carlson | 160/233 |
| 2,486,764 | A | * | 11/1949 | Singer | 361/726 |
| 2,530,945 | A | * | 11/1950 | Chapman et al. | 361/837 |
| 2,789,024 | A | * | 4/1957 | Heisler | 312/333 |
| 2,861,858 | A | * | 11/1958 | Petschauer | 312/283 |
| 2,880,379 | A | * | 3/1959 | Stoddart et al. | 361/727 |
| 3,014,160 | A | * | 12/1961 | Brogden | 361/727 |
| 3,356,432 | A | * | 12/1967 | Stroud et al. | 312/323 |
| 3,717,805 | A | * | 2/1973 | Gnaedinger et al. | 363/13 |
| 4,305,114 | A | | 12/1981 | Takagi et al. | |
| 5,398,161 | A | * | 3/1995 | Roy | 361/727 |
| 5,460,441 | A | * | 10/1995 | Hastings et al. | 312/298 |
| 5,571,256 | A | * | 11/1996 | Good et al. | 211/26 |
| 5,949,645 | A | * | 9/1999 | Aziz et al. | 361/695 |
| 6,025,989 | A | * | 2/2000 | Ayd et al. | 361/695 |
| 6,034,868 | A | * | 3/2000 | Paul | 361/679.02 |
| 6,143,985 | A | * | 11/2000 | Knapp et al. | 174/69 |
| 6,259,605 | B1 | * | 7/2001 | Schmitt | 361/727 |
| 6,404,625 | B1 | * | 6/2002 | Chen et al. | 361/679.33 |

(Continued)

FOREIGN PATENT DOCUMENTS

GB                 783957        10/1957
WO        WO 01/34259     *   5/2001

*Primary Examiner* — Janet M Wilkens
(74) *Attorney, Agent, or Firm* — The Van Winkle Law Firm; Steven C. Schnedler

(57) ABSTRACT

A draw-out control compartment including a drawer housing open opposite a drawer housing rear wall to define a front opening. A control component support structure is received within the drawer housing and supported on drawer slides. A cable storage compartment is adjacent a rear wall of the drawer housing on the exterior side thereof, and opens into the housing interior. A control cable is attached to the control component support structure and extends into the cable storage compartment. The control cable has a length which permits the drawer-like control component support structure to be pulled out of the drawer housing with the control cable remaining attached, with excess length of the control cable when the control component support structure is all the way within the drawer housing being stored within the cable storage compartment.

12 Claims, 14 Drawing Sheets

(56) References Cited

U.S. PATENT DOCUMENTS

| | | |
|---|---|---|
| 6,512,669 B1 | 1/2003 | Goodwin et al. |
| 6,590,151 B1 * | 7/2003 | Merk et al. .................... 174/365 |
| 6,717,076 B2 | 4/2004 | Narusevicius et al. |
| 6,719,149 B2 * | 4/2004 | Tomino ........................... 211/26 |
| 6,788,542 B2 * | 9/2004 | Rumney ........................ 361/724 |
| 7,277,294 B2 | 10/2007 | Carlson |
| 7,583,507 B2 * | 9/2009 | Starr et al. .................... 361/727 |
| 2010/0172087 A1 * | 7/2010 | Jeffery et al. ............ 361/679.33 |

* cited by examiner

DRAW OUT CONTROL COMPARTMENT

CROSS-REFERENCE TO RELATED APPLICATION

The benefit of U.S. provisional patent application Ser. No. 61/451,390, filed Mar. 10, 2011, and titled "Draw Out Control Compartment" is claimed, the entire disclosure of which is hereby expressly incorporated by reference.

This is a companion to concurrently-filed U.S. patent application Ser. No. 13/414,287, filed Mar. 7, 2012, titled "Racking Contactor," which in turn claims the benefit of U.S. provisional patent application Ser. No. 61/451,407, filed Mar. 10, 2011; and to concurrently-filed U.S. patent application Ser. No. 13/414,327, filed Mar. 7, 2012, titled "Illumination and Visual Indicator," which in turn claims the benefit of U.S. provisional patent application Ser. No. 61/451,416, filed Mar. 10, 2011; the entire disclosures of which are hereby expressly incorporated by reference.

BACKGROUND OF THE INVENTION

The invention relates generally to electrical feeder circuits, and, more particularly, to modularized feeder circuit control panels for power distribution centers employed in underground mining activities. However, embodiments of the invention are not limited to that environment or context.

Carlson U.S. Pat. No. 7,277,294 titled "Contactor Draw Out Tray," the entire disclosure of which is hereby expressly incorporated by reference, discloses electrical circuit protector apparatus which has a stationary frame and a movable frame. The stationary frame is housed within a power distribution center and has input terminals for incoming electrical power, and output terminals for delivering electrical power to equipment operating on a feeder circuit, for example equipment in the form of a mining machine including an electric motor. The movable frame is drawer-like and includes a slide-out support tray having a front panel, and may be referred to as a draw out tray. The movable frame or draw out tray carries what may broadly be described as electrical components for the electrical circuit protector, including a disconnect/grounding switch, a contactor and a controller. A particular example of electrical components for the electrical circuit protector is a motor starter. The controller, by way of example, includes logic circuitry, communication circuitry for remote control, and protective relays. The disconnect/grounding switch is part of a mechanism which mechanically locks the movable frame relative to the stationary frame, and in particular ensures that the disconnect switch is open and the output conductors are grounded before the movable frame is drawn out of the stationary frame.

In the apparatus disclosed in Carlson U.S. Pat. No. 7,277,294 the controller is located within a control compartment or housing in the form of a sheet metal box accessible through an opening in the front panel. The sheet metal box is closed by a front control panel bolted around the opening in the front panel. Some components are mounted within the control compartment, and other components are mounted to the front cover panel. As illustrated in FIGS. 1 and 2, in commercial embodiments, the front control panel tilts forward for access to the components mounted within the control compartment and to the components mounted to the front control panel.

SUMMARY OF THE INVENTION

In one aspect, a draw-out control compartment is provided. The draw-out control compartment includes a drawer housing having a front opening. A drawer-like control component support structure is received within the drawer housing and supported on drawer slides. The control component support structure has a front end and a rear end. A control compartment front panel is hingedly attached to the front end of the drawer-like control component support structure.

In another aspect, a draw-out control compartment is provided. The draw-out control compartment includes a drawer housing with a housing interior and having a drawer housing rear wall with an interior side and an exterior side. The drawer housing is open opposite the drawer housing rear wall to define a front opening. A cable storage compartment is adjacent the drawer housing rear wall on the exterior side and opens into the housing interior through an aperture in the drawer housing rear wall. A drawer-like control component support structure is received within the drawer housing and supported on drawer slides. The control component support structure has a front end and a rear end. A control compartment front panel is attached to the front end of the drawer-like control component support structure, and a control compartment rear wall is attached to the rear end of the drawer-like control component support structure. A control cable is attached to the control component support structure and extends into the cable storage compartment. The control cable has a length which permits the drawer-like control component support structure to be pulled out of the drawer housing with the control cable remaining attached, with excess length of the control cable when the control component support structure is all the way within the drawer housing being stored within the cable storage compartment.

In yet another aspect, electrical equipment is provided. The electrical equipment includes a stationary frame, and a drawer-like movable frame slidably carried on the stationary frame. The drawer-like movable frame has an equipment front panel, with an aperture in the equipment front panel. The electrical equipment additionally includes a control compartment drawer housing having a control compartment drawer housing front opening. The control compartment drawer housing is secured behind the equipment front panel, the front opening of the control compartment drawer housing aligning with the aperture in the equipment front panel. A drawer-like control component support structure is received within the control compartment drawer housing and is supported on control compartment drawer slides, the control component support structure having a front end and a rear end. A control compartment front panel having a lower edge is attached to the front end of the drawer-like control component support structure.

DETAILED DESCRIPTION

Figure 1:
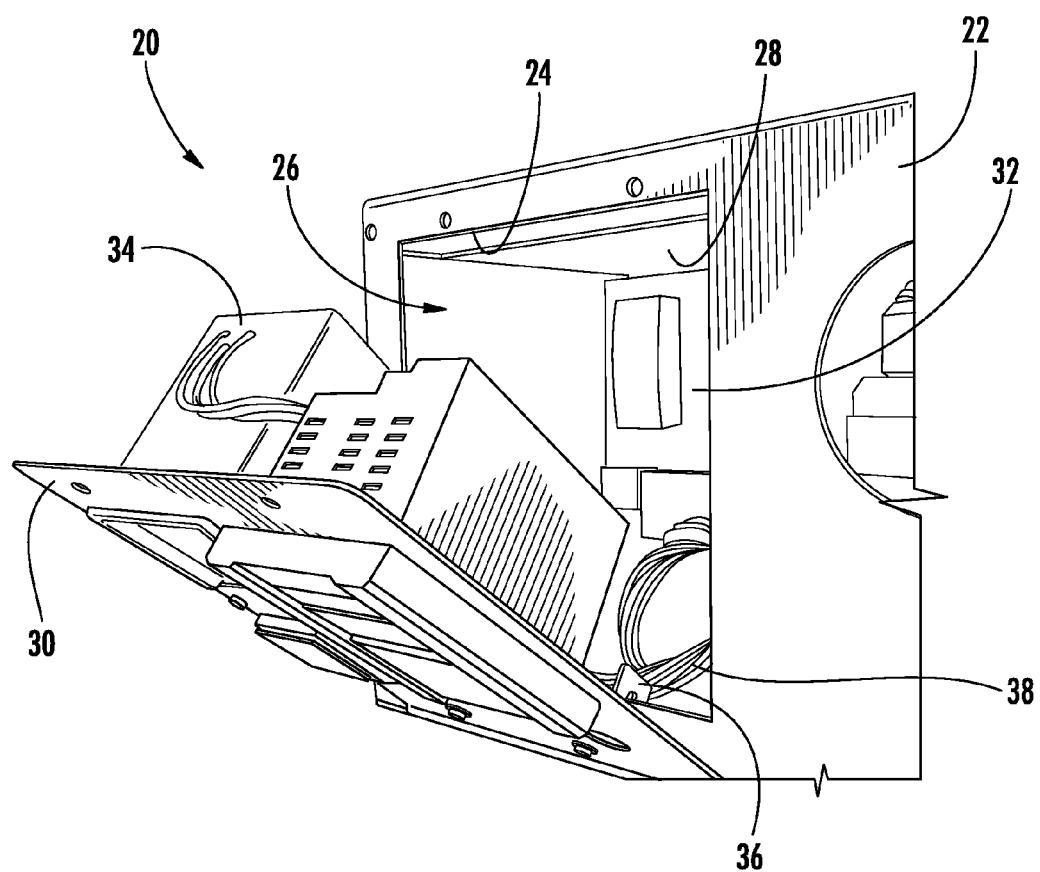
FIG. 1 is a three-dimensional view generally from the right front illustrating a prior art commercial embodiment of apparatus corresponding to Carlson U.S. Pat. No. 7,277,294, showing a portion of a drawer-like movable frame with a front panel, with a control panel portion thereof tilted forward for access to a control compartment.
Figure 2:
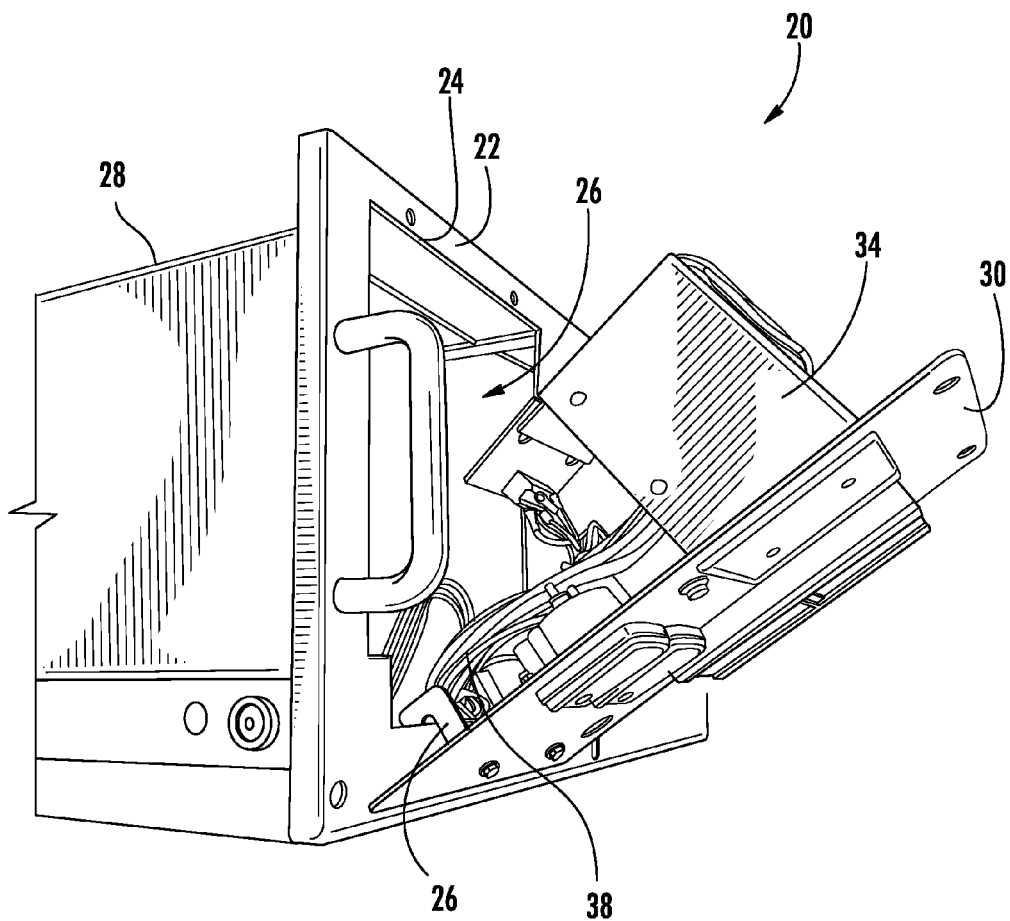
FIG. 2 is a three-dimensional view generally from the left front of the prior art apparatus of FIG. 1.
Figure 3:
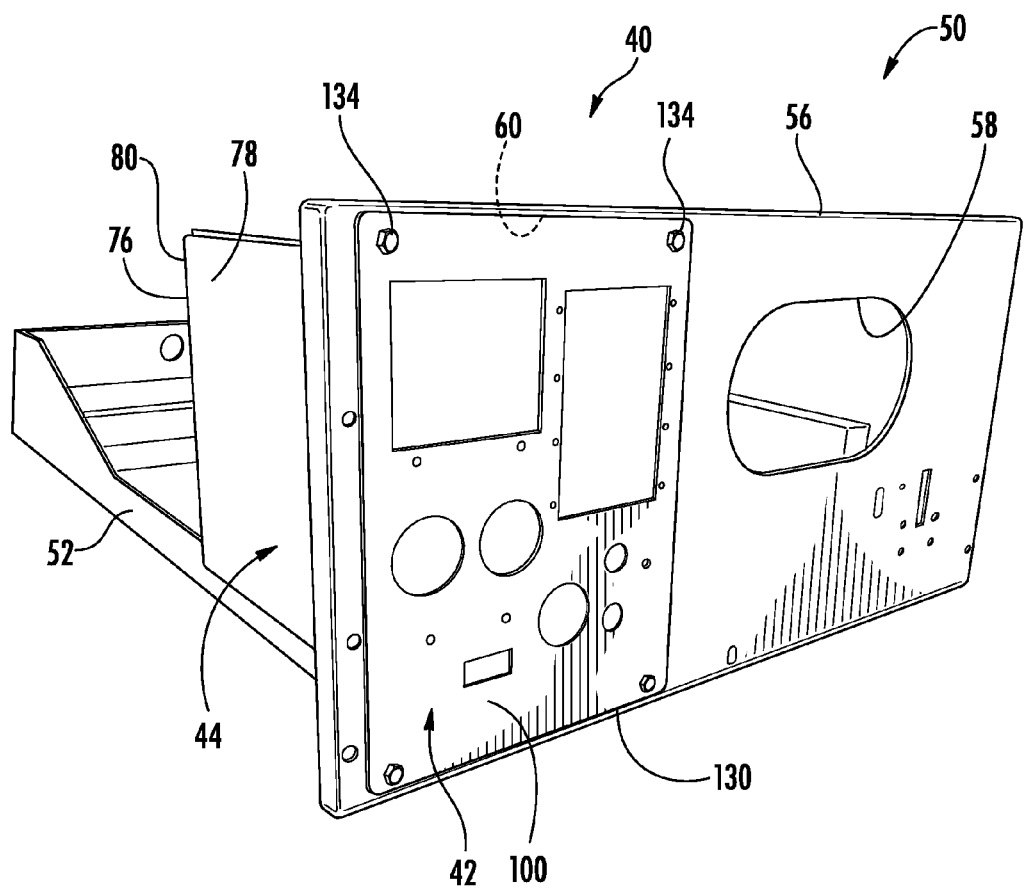
FIG. 3 is a three-dimensional view generally from the left front of electrical equipment in the form of a drawer-like movable frame or draw out tray, in turn including a draw out control compartment with a drawer-like control component support structure embodying the invention, for purposes of illustration including structural portions only without electrical components, in a first configuration with the draw out control compartment fully closed.

Referring first to FIGS. 1 and 2, a prior art drawer-like movable frame 20 or draw out tray 20 corresponding to the movable frame as disclosed in Carlson U.S. Pat. No. 7,277,294 is illustrated. The drawer-like moveable frame 20 includes a front panel 22. The front panel 22 has a rectangular opening 24 which provides access to the interior of a control compartment 26 in the form of a sheet metal box 28. The sheet metal box 28 is closed by a front control panel 30 bolted around the opening 24 in the front panel 22. Some components, generally represented at 32, are mounted within the control compartment 26. Other components, generally represented at 34, are mounted to the front control panel 30.

For access to the components 32 and 34, the front control panel 30 tilts forward, and can be held in the tilted configuration of FIGS. 1 and 2 by hook-like hangers 36 which engage the lower edge of the opening 24. The hangers 36 also can be disengaged allowing the control panel 30 to be pulled farther out, limited only by a wiring harness 38.

In the structure as described above with reference to FIGS. 1 and 2, and generally corresponding to the disclosure of Carlson U.S. Pat. No. 7,277,294, in which there is a fixed control compartment 26 or housing in the form of a sheet metal box 28 accessible from the front panel 22, accessibility is limited, and working on components on 30 and 32 for maintenance purposes is problematic.

In overview, the subject invention is embodied in what is herein termed a draw out control compartment, generally designated 40. A drawer-like control component support structure 42 is received within a control compartment drawer housing 44, as is described in detail hereinbelow, and supports various control components, collectively designated 46. The subject draw out control compartment 40 may be included as part of electrical equipment such as a contactor draw out tray generally as disclosed in Carlson U.S. Pat. No. 7,277,294. In other words, electrical equipment embodying the invention may include two draw-out elements, a drawer-like movable frame or draw out tray which pulls out of a stationary frame as disclosed in Carlson U.S. Pat. No. 7,277,294, as well as a drawer-like control component support structure 42.

Although the draw out control compartment 40 embodying the invention is described and illustrated herein in the context of a contactor draw out tray such as is disclosed in Carlson U.S. Pat. No. 7,277,294, draw out control compartments embodying the invention are not limited to that particular environment.

With particular reference to FIGS. 3-6, electrical equipment 50, by way of example and not limitation an electrical feeder circuit protector 50, embodying the invention is shown in a first configuration (fully closed, as described in detail hereinbelow). Referring to FIGS. 3-14, the electrical equipment 50 is illustrated in five configurations. Since the components are the same in all five configurations, the five configurations are in general described together.

Figure 4:
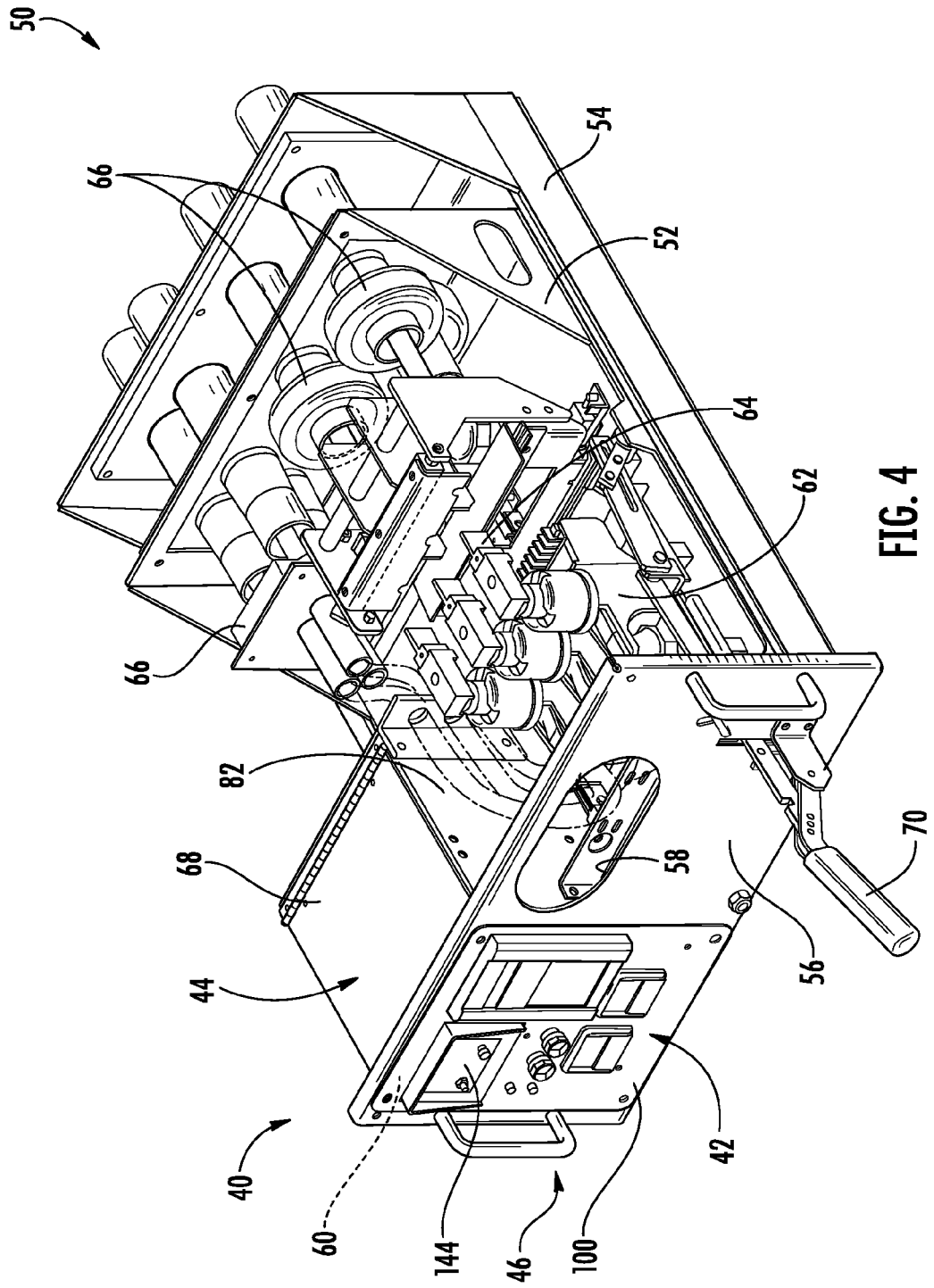
FIG. 4 is a three-dimensional view, generally from the right front, of a more complete electrical equipment including a drawer-like movable frame or draw out tray of FIG. 3 received in a stationary frame and including a drawer-like draw out control compartment embodying the invention, with the draw out control compartment fully closed, generally corresponding to the first configuration of FIG. 3, but with electrical components also shown, in addition to the stationary frame being shown.
Figure 5:
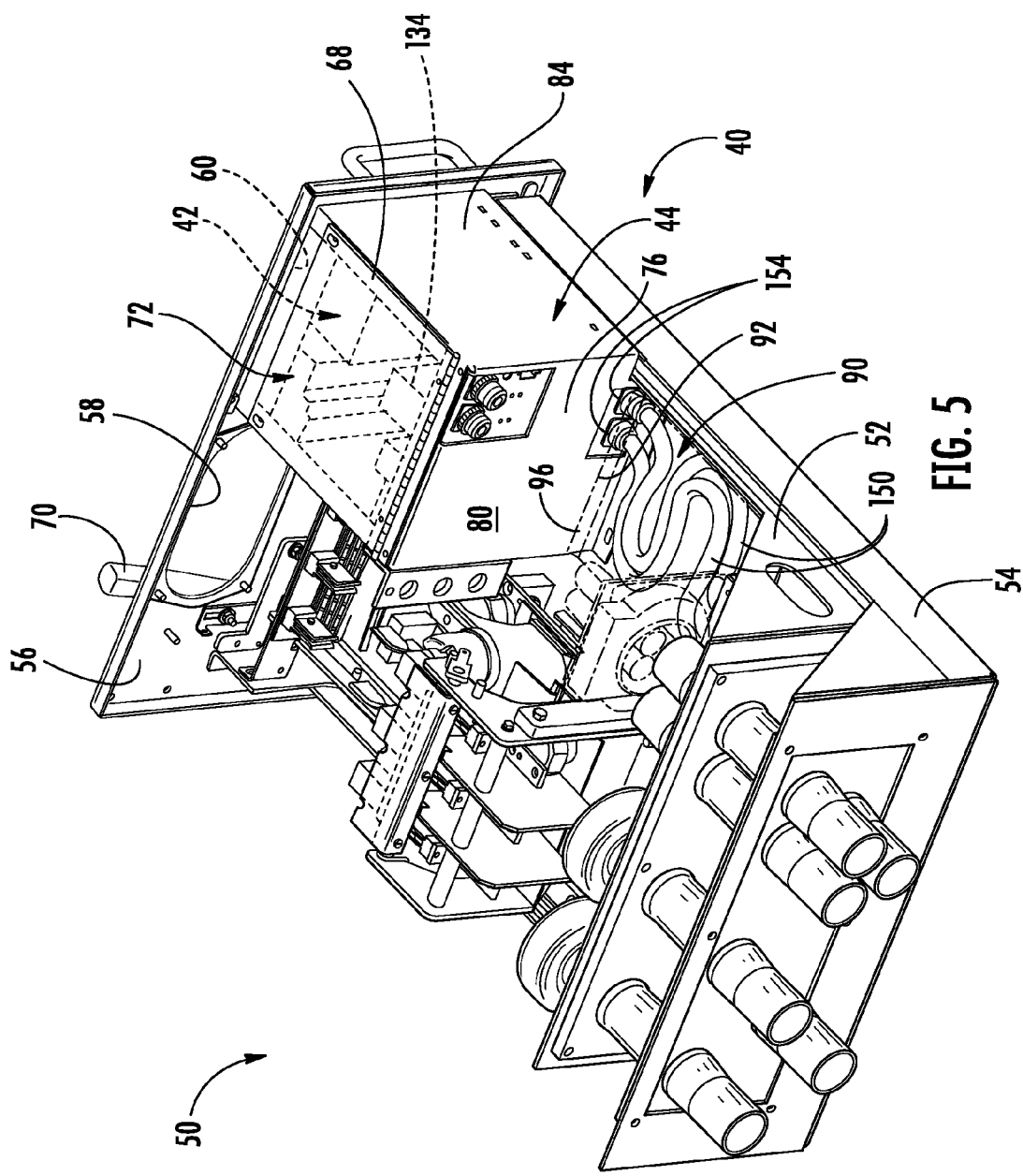
FIG. 5 is a three dimensional view, generally from the left rear, of the electrical equipment of FIG. 4 in the first configuration, illustrating a control cable within a cable storage compartment.

In its overall context, the electrical equipment 50 includes a drawer-like movable frame generally designated 52 slidably received in a stationary frame 54 (the stationary frame 54 is shown in FIGS. 4 and 5, but not in FIG. 3), as is described in greater detail in the above-incorporated companion application Ser. No. 13/414,287, filed Mar. 7, 2012, titled "Racking Contactor." The drawer-like moveable frame 52 has an equipment front panel 56 including a viewing window 58 represented as a viewing window aperture 58, as well as a control compartment aperture 60. Mounted to and carried by the drawer-like moveable frame 52, behind the equipment front panel 56, are various circuit protector components, including an electrically-actuated contactor 62, a visible disconnect/grounding switch generally designated 64, and various sensors such as current transformers 66. By way of example and not limitation, the visible disconnect switch 64 in the illustrated embodiment is described in greater detail in the above-incorporated companion application Ser. No. 13/414,287, filed Mar. 7, 2012, titled "Racking Contactor." However, in embodiments of the invention the visible disconnect switch disclosed in Carlson U.S. Pat. No. 7,277,294 may as well be employed.

The control compartment drawer housing 44 is secured behind the equipment front panel 56 in alignment with the control compartment aperture 60. The control compartment drawer housing 44 has a hinged top 68 for access. A switch handle 70 on the equipment front panel 56 operates the visible disconnect/grounding switch 64, and operation of the disconnect/grounding switch 64 is observed and verified through the viewing window 58, as is described in greater detail in the above-incorporated companion application Ser. Nos. 13/414,287 and 13/414,327, both filed Mar. 7, 2012, respectively titled "Racking Contactor" and "Illumination and Visual Indicator."

The control compartment drawer housing 44 defines an interior 72. In addition to the hinged top wall 68, the control compartment drawer housing 44 has a bottom wall 74 (FIG. 14), as well as a drawer housing rear wall 76 with an interior side 78 and an exterior side 80. The control compartment drawer housing 44 also has side walls 82 and 84. The control compartment drawer housing 44 is open opposite the drawer housing rear wall 76 to define a front opening 86. The front opening 86 is in alignment with the control compartment aperture 60 in the equipment front panel.

With particular reference to FIG. 5, adjacent the housing 44 rear will 76 on the exterior side 78 thereof is a cable storage compartment 90, which, in the disclosed embodiment, takes the form of a relatively flat rectangular channel-like structure (open at its front and back) located at a lower edge 92 of the control compartment drawer housing 44 rear wall 76, along the bottom of the movable frame 52. The cable storage compartment 90 is defined in part by a top wall 94, which, for purposes of illustration, is drawn as a transparent structure in FIG. 5 (but solid in FIG. 13). The cable storage compartment 90 opens into the interior 72 of the control compartment drawer housing 44 through an aperture 96 in the drawer housing rear wall 76.

The drawer-like control component support structure 42 has a control compartment front panel 100 and is received within the control compartment drawer housing 44. In general, what is herein termed the draw out control compartment 40 includes the control compartment drawer housing 44 and the drawer-like control component support structure 42 with its control compartment front panel 100.

More particularly, the drawer-like control component support structure 42 includes a channel-like structural base 110 defining a front end 112 and a rear end 114 of the control component support structure 42. The structural base 110 has a flat bottom 116 and longitudinal sides 118 and 120 which engage full extension drawer slides 122 and 124. The drawer slides 122 and 124 are conventional, and may include either rollers, or simple sliding surfaces. Stationary parts 126 of the drawer slides 122 and 124 are fixed to the sides of the control compartment drawer housing 44 within the control compartment drawer housing 44. Thus, the control support structure 42 slides between its fully-closed position in the first configuration of FIGS. 3-6, and its fully-open position in the fourth configuration of FIGS. 11-13. In addition, the drawer slides 122 and 124 can be entirely disengaged so that the drawer-like control component support structure 42 is entirely removed from the control compartment drawer housing 44, in the fifth configuration of FIG. 14. Accordingly, the control component support structure 42 is readily removable from and replaceable within the drawing housing 44.

The front panel 100 has a lower edge 130, and is attached to the front end 112 of the control component support structure 42. In the illustrated embodiment, the front panel is attached at or near its lower edge 130 by a hinge 132 to the flat bottom 116 of the structural base 110. In the fully closed first configuration of FIGS. 3-6, the front panel 100 of the control component support structure 42 is against the equipment front panel 56, and is secured by bolts 134. A control component support structure rear wall 136 is attached to the rear end 114 of the drawer-like control component support structure 42.

Various of the electrical control components 46 are illustrated in FIGS. 4, 5, 9, 10, 12, 13 and 14, but, for clarity of illustration, are omitted from FIGS. 3, 7, 8, and 11. In particular, various components generally designated 140 are mounted to the rear wall 134. Various components generally designated 142 are mounted to the base 110. Various other components 144, particularly displays and switches, are mounted to the front panel 100 of the component support structure 42.

Significantly, no control components are mounted directly within the control compartment drawer housing 44. All control components 46 are carried directly or indirectly by the drawer-like control component support structure 42.

Figure 6:
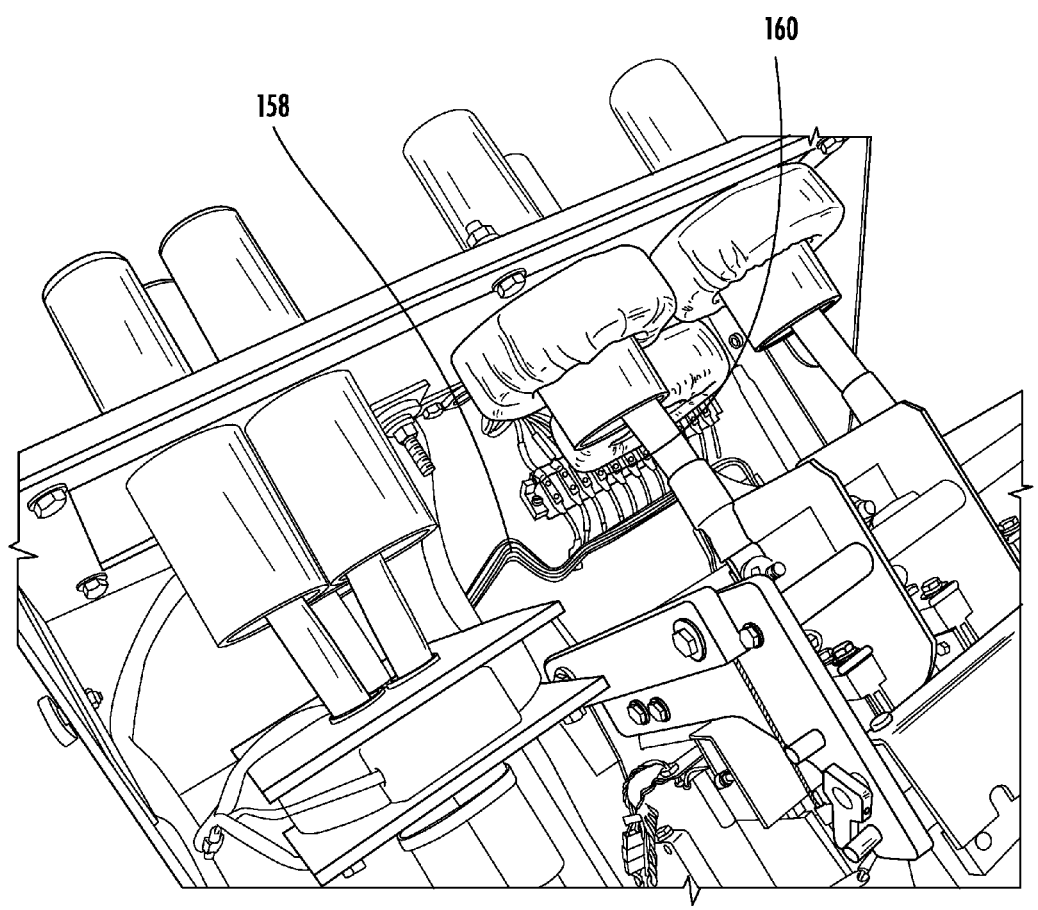
FIG. 6 is a three-dimensional view, generally from the upper left front, illustrating a terminal block termination for the control cable.
Figure 10:
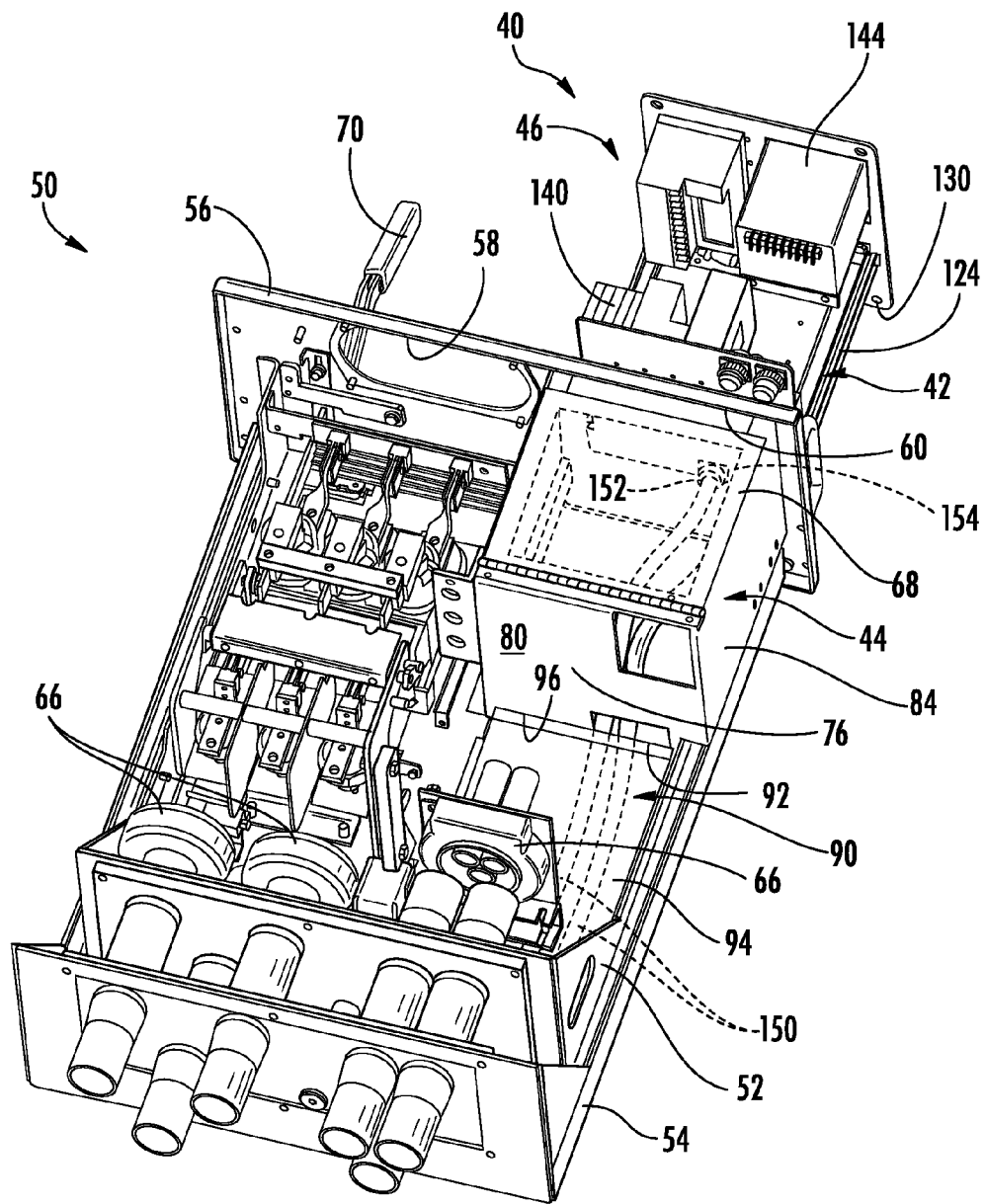
FIG. 10 is a three-dimensional view, in the same orientation as FIG. 5, corresponding to the third configuration of FIG. 9, illustrating the control cable with the drawer-like control component support structure of the draw out control compartment all the way out of the control compartment drawer housing, but not entirely removed.

With particular reference to FIGS. 5, 6 and 10, to provide electrical connections between the various control components 46 on the drawer-like component support structure 42 and the various circuit protector components mounted to and carried by the drawer-like moveable frame 52 (e.g. the, electrically-actuated contactor 62 and sensors such as current transformers 66), at least one multi-conductor control cable 150 is provided. (In the illustrated embodiment there are a pair of control cables 150.) Each control cable 150 has one end 152 connected or attached to the control component support structure 42, more particularly near the bottom of the rear wall 136, and extends into and through the cable storage compartment 90. Connectors 154 are visible in FIG. 5, and apertures 156 for the connectors 154 are visible in the structural FIGS. 7 and 8. The other ends 158 of the multi-conductor control cables 150 terminate at a terminal block 160 (FIG. 6) secured to the movable frame 52, as the cables 150 pass through the cable storage compartment 90. The cable storage compartment 90 has a height sufficient to accommodate the control cable 150, but less than the height of the drawer housing rear wall 136.

The control cable 150 has a length which permits the drawer-like control component support structure 42 to be pulled out of the drawer housing 44, with the control cable 150 remaining attached, with excess length of the control cable 150 when the control component support structure 42 is all the way within the drawer housing 44 being stored within the cable storage compartment 90.

In the first configuration of the electrical equipment 50 illustrated in FIGS. 3-6, the drawer-like control component support structure 42 is essentially entirely within the control compartment drawer housing 44, with the control compartment front panel 100 either against or flush with the equipment front panel 56. This first configuration may be described as the configuration in which the draw out control compartment 40 is fully closed.

In the fully-closed first configuration of FIGS. 3-6, the rear wall 136 of the control component support structure 42 is inside and immediately adjacent the rear wall 76 of the control compartment drawer housing 44, and the front panel 100 of the control component support structure 42 is either against or coplanar with the equipment front panel 56. In the illustrated embodiment, the front panel 100 of the control component support structure 42 is against the equipment front panel 56, and is secured by the bolts 134.

Figure 7:
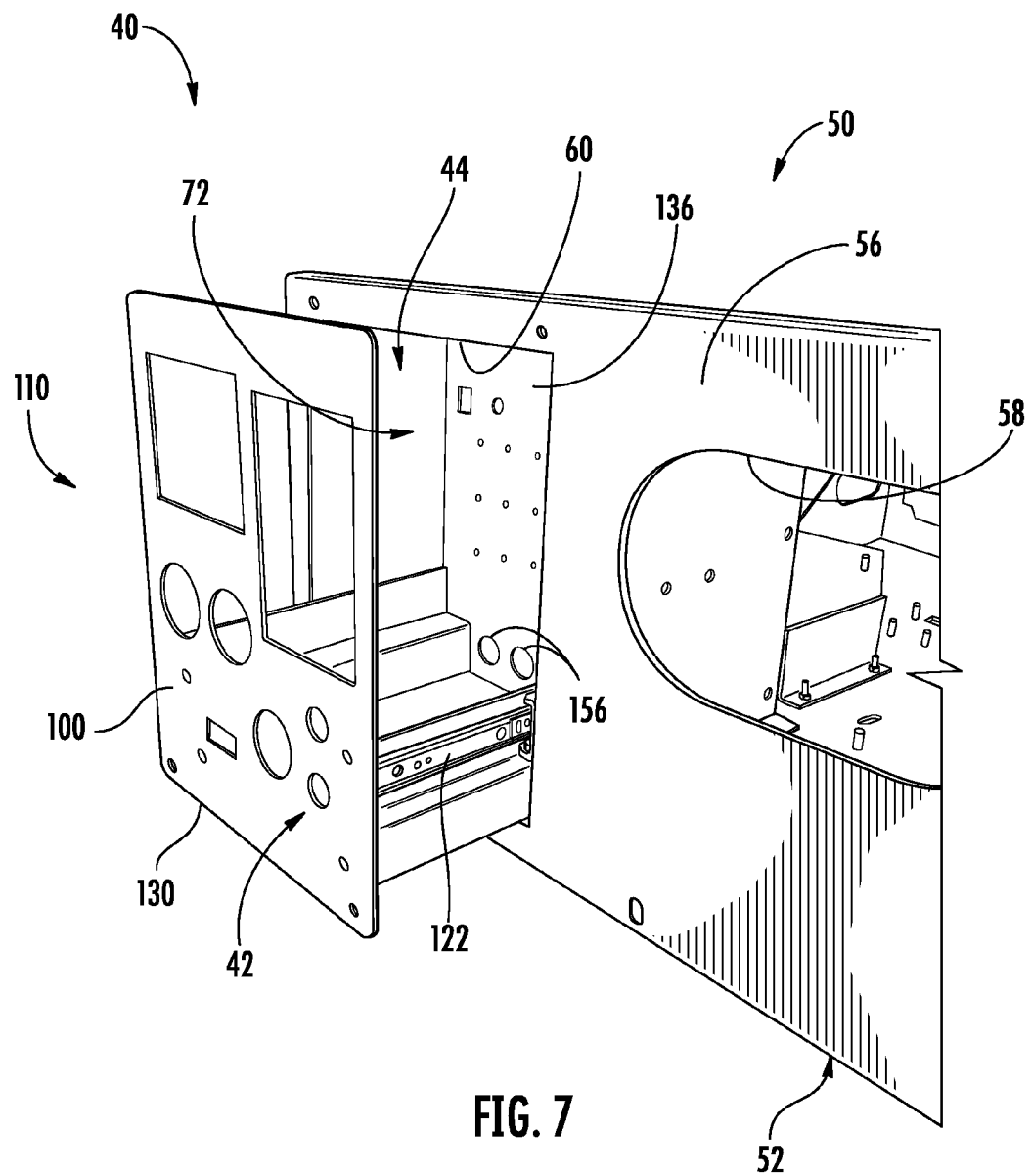
FIG. 7 is a three-dimensional view generally from the right front, of the electrical equipment of FIG. 3, again for purposes of illustration including structural portions only without electrical components, in a second configuration with the drawer-like control component support structure of the draw out control compartment pulled part way out of the control compartment drawer housing.

FIG. 7 illustrates a second configuration in which the drawer-like control component support structure 42 is pulled or drawn part way out of the control compartment drawer housing 44.

Figure 8:
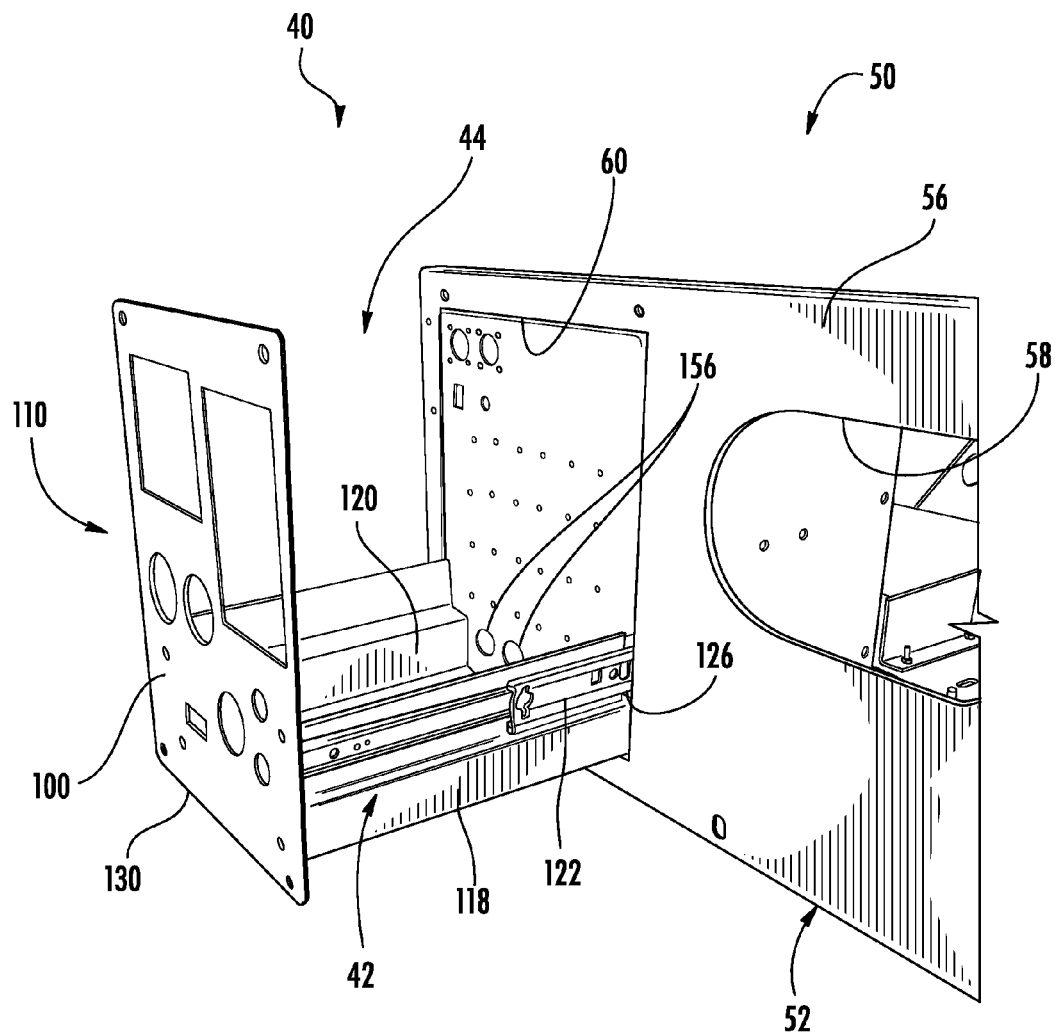
FIG. 8 is a three-dimensional view in the same orientation as FIG. 7, again for purposes of illustration including structural portions only without electrical components, in a third configuration with the drawer-like control component support structure of the draw out control compartment all the way out of the control compartment drawer housing, but not entirely removed.
Figure 9:
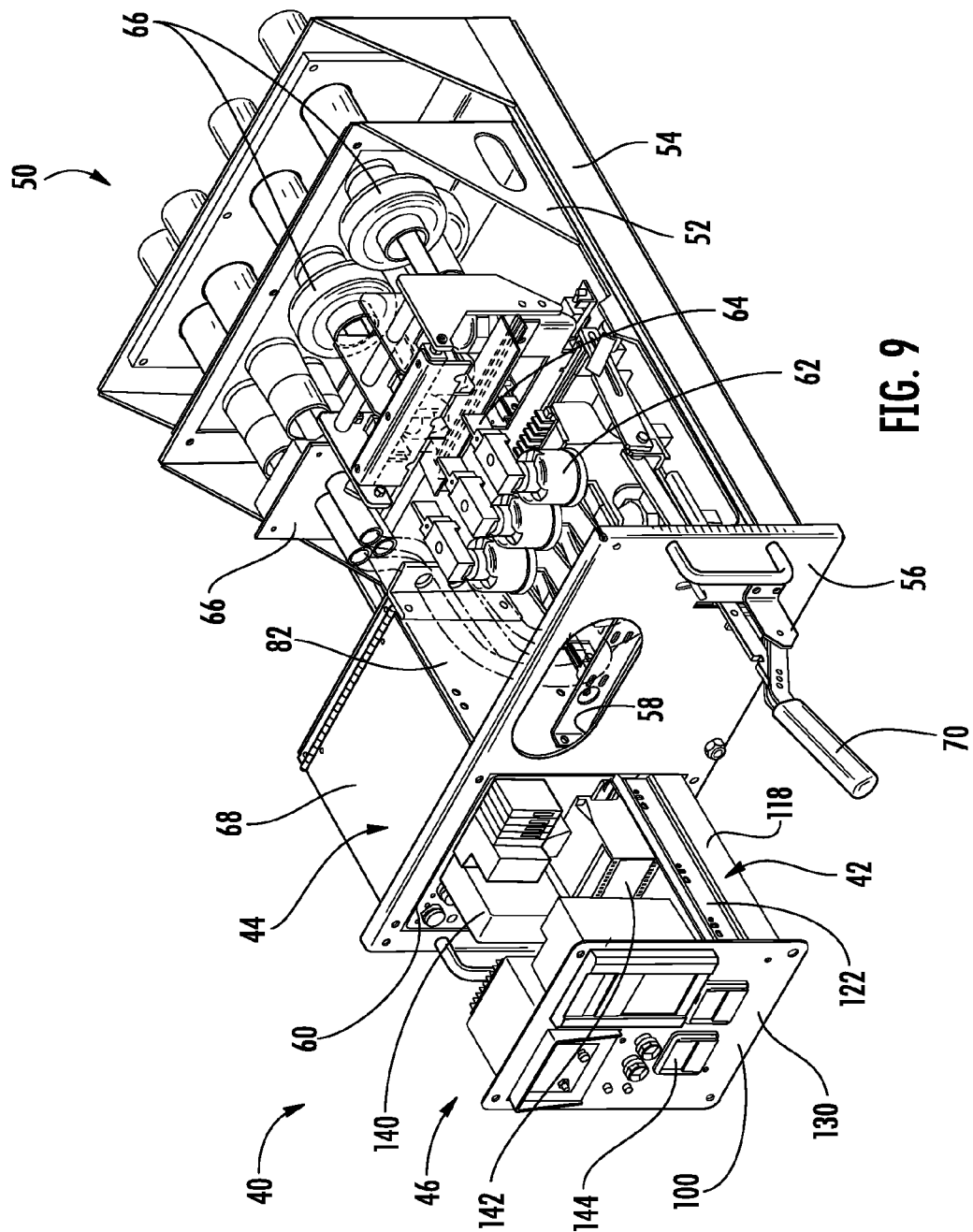
FIG. 9 is a three-dimensional in the same orientation as FIG. 4 of the more complete electrical equipment, with the drawer-like control component support structure of the draw out control compartment all the way out of the control compartment drawer housing, but not entirely removed, generally corresponding to the third configuration of FIG. 8, but with electrical components also shown, in addition to the stationary frame being shown.

FIGS. 8-10 illustrate a third configuration in which with the drawer-like control component support structure 42 is all the way out of the control compartment drawer housing 44, but not entirely removed.

In the fully-open third configuration of FIGS. 8-10, the rear wall 136 of the control component support structure 42 is generally coplanar with the equipment front panel 56.

Figure 11:
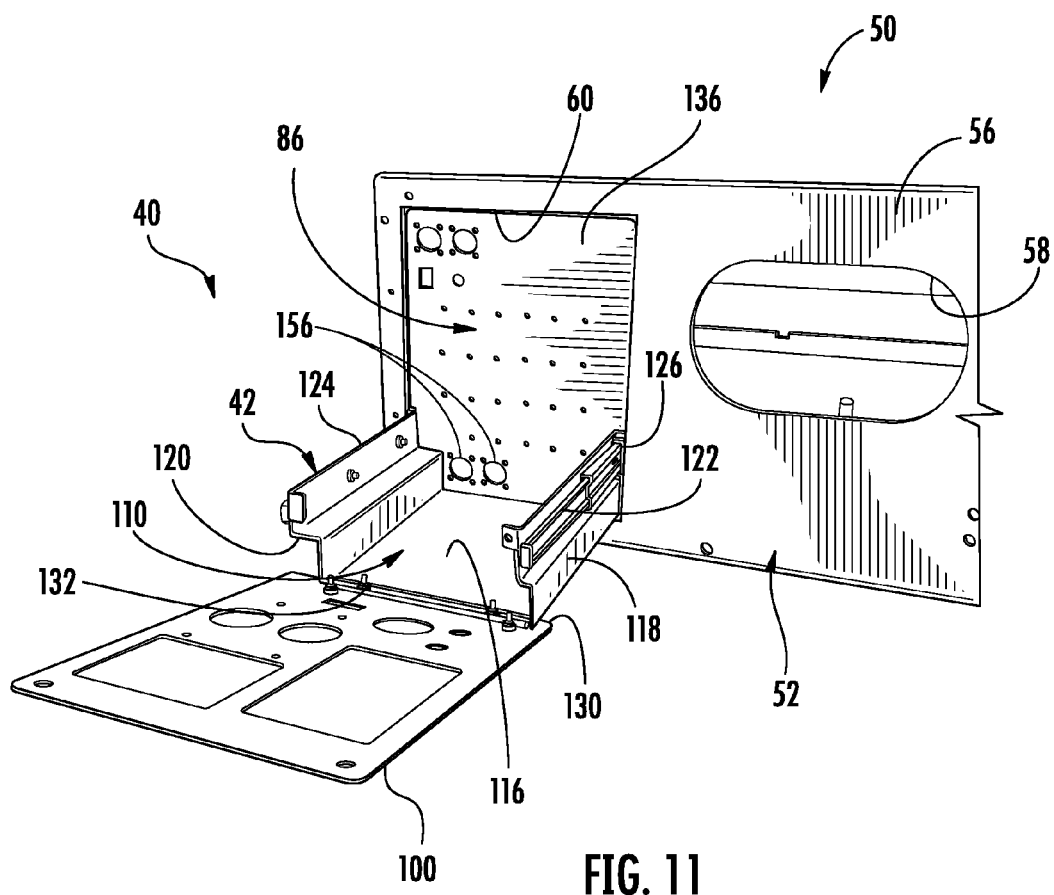
FIG. 11 is a three-dimensional view generally from the right front, of the apparatus of FIG. 3, again for purposes of illustration including structural portions only without electrical components, in a fourth configuration with the drawer-like control component support structure of the draw out control compartment pulled all the way out of the control compartment drawer housing, but not entirely removed, and the hinged front control compartment panel tilted down for enhanced access.
Figure 12:
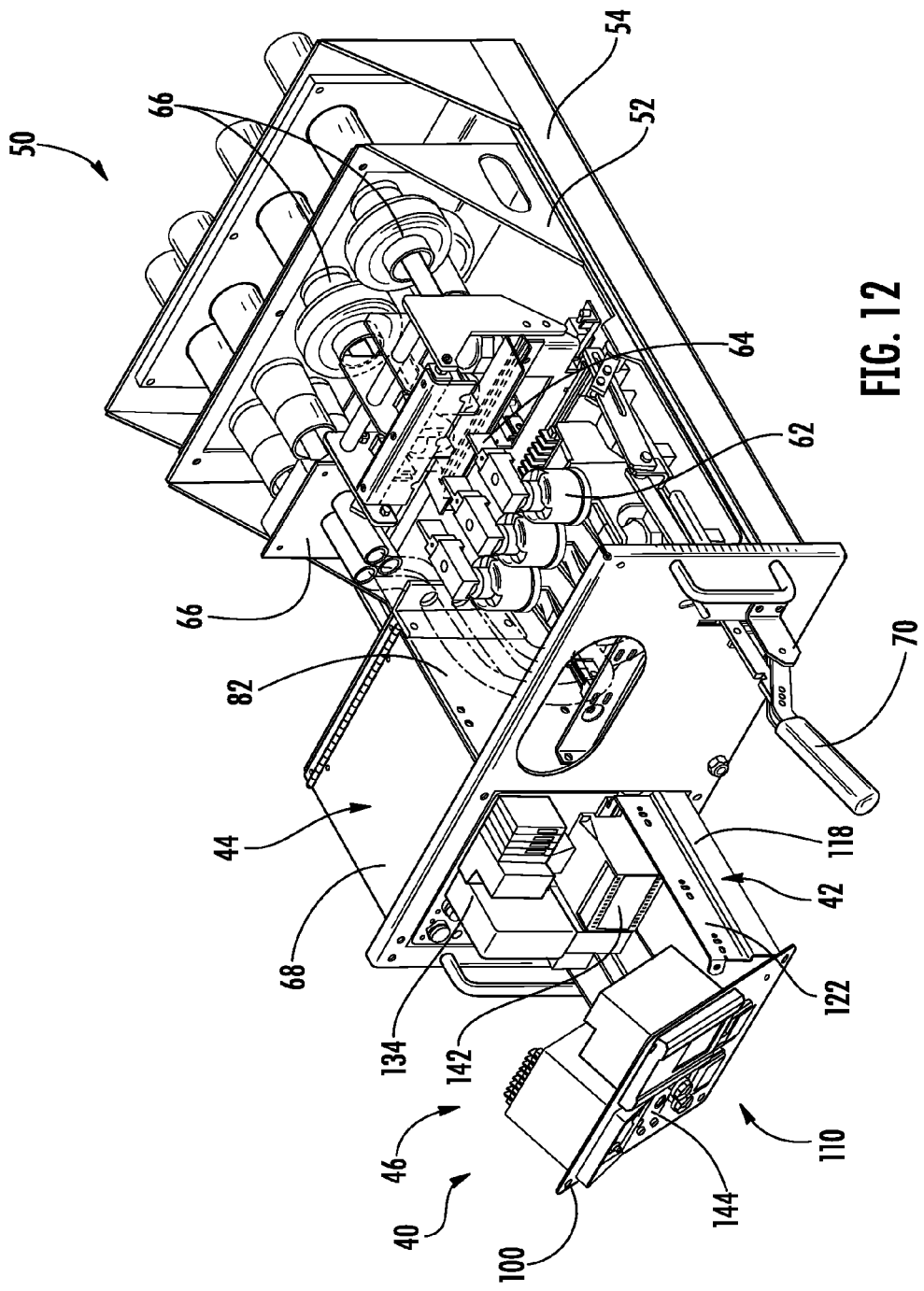
FIG. 12 is a three-dimensional view in the same orientation as FIG. 4 of the more complete electrical equipment, with the drawer-like control component support structure of the draw out control compartment all the way out of the control compartment drawer housing, but not entirely removed, and the hinged front control compartment panel tilted down for enhanced access, generally corresponding to the fourth configuration of FIG. 11, but with electrical components also shown, in addition to the stationary frame being shown.
Figure 13:
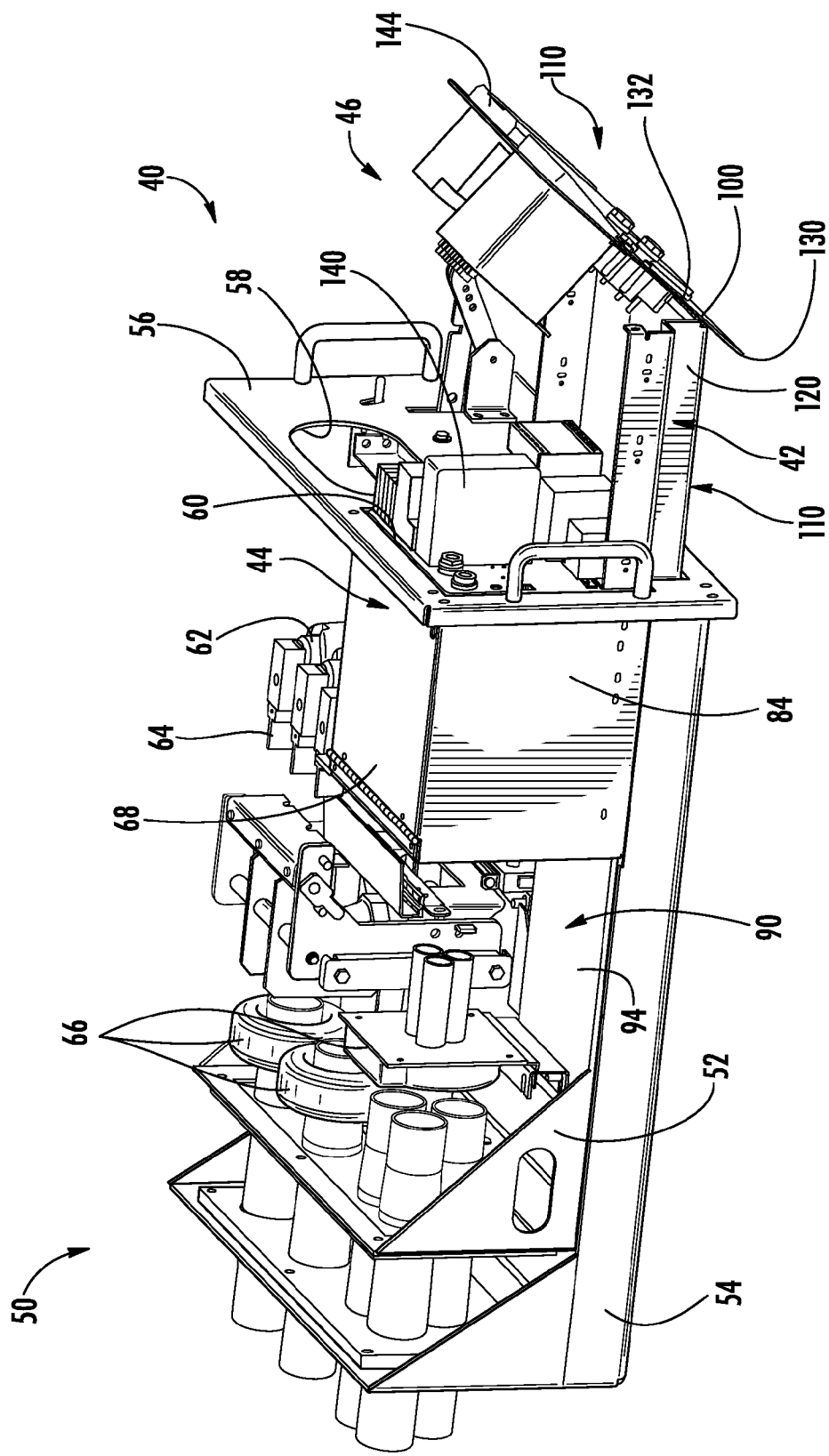
FIG. 13 is a three-dimensional view, generally from the left front, of the electrical equipment of FIG. 12, in the fourth configuration.

FIGS. 11-13 illustrate a fourth configuration in which the drawer-like control component support structure 42 is pulled all the way out of the control compartment drawer housing 44, but not entirely removed, and the control compartment front panel 100, which is hinged, is tilted down for enhanced access.

Figure 14:
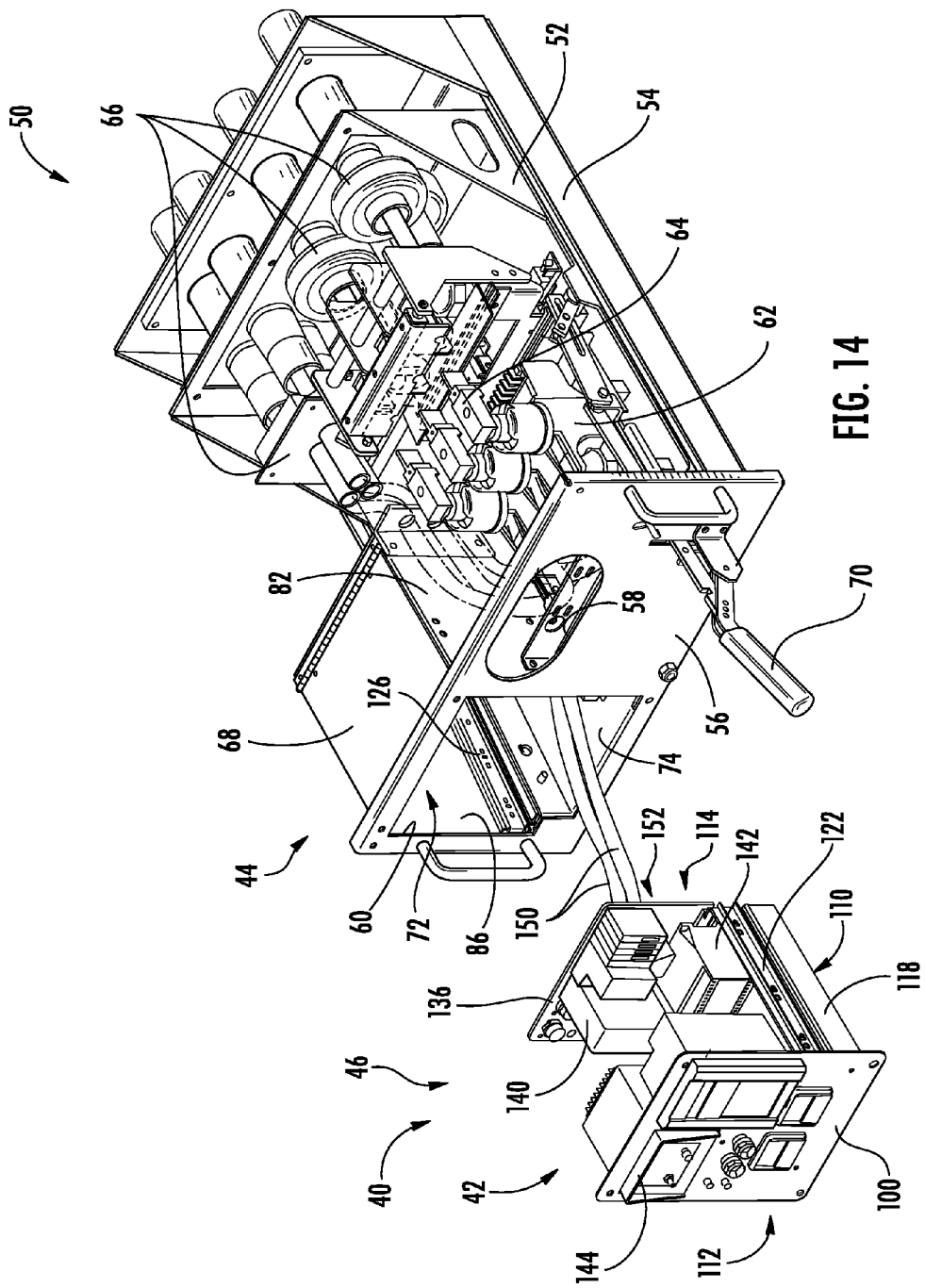
FIG. 14 is a three-dimensional view, generally from the right front in the same orientation as FIG. 4, in a fifth configuration wherein the drawer-like control component support structure of the draw out control compartment is entirely removed from of the control compartment drawer housing, tethered only by a pair of cables.

FIG. 14 illustrates a fifth and final configuration in which the drawer-like control component support structure 42 is entirely removed from the control compartment drawer housing 44, tethered only by the control cables 150. Again, since the drawer slides 122 and 124 can be disengaged in a conventional manner, the control component support structure 42 is readily removable from and replaceable within the drawer housing 44.

It will be appreciated that embodiments of the invention provide far easier access to the components 140, 142 and 144 compared to the prior art approach described above with reference to FIGS. 1 and 2. In the third, fourth and fifth configurations (of FIGS. 8-10, FIGS. 11-13, and FIG. 14), the components 140, 142 and 144 are drawn entirely out of the control compartment drawer housing 44, and can more readily be serviced without having to reach into the compartment drawer housing 44. It is also possible to access and service the control components 140, 142 and 144 with the exemplary electrical feeder circuit protector 50 energized and operating, since the control compartment drawer housing provides a physical barrier against a person reaching in and contacting high voltage components, such as the visible disconnect switch within the circuit protector 50.

In addition, the control component support structure 42 and the components 140, 142 and 144 supported thereby can be pulled out and replaced as a unit. As noted above, no control components are mounted directly within the control compartment drawer housing 44. All control components 46 are carried directly or indirectly by the drawer-like control component support structure 42.

Advantages of the subject draw out control compartment 40 compared to the apparatus of Carlson U.S. Pat. No. 7,277,294, as an example, include:
1) Safety;
2) Improved serviceability in troubleshooting;
3) Improved component replacement capability;
4) Easier access to devices for adjustments;
5) Ability to remove and replace the entire controller as a subassembly unit; and
6) Enhanced assembly of the overall apparatus, such as a motor starter; thus reducing manufacturing time and cost.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A draw-out control compartment comprising:
a drawer housing having a front opening, said drawer housing being secured to and behind an equipment front panel having an aperture, said front opening of said drawer housing aligning with said aperture;
a control component support structure received within said drawer housing and supported on drawer slides, said control component support structure having a front end and a rear end;
a control compartment front panel hingedly attached to said front end of said control component support structure; and
electrical control components secured to said control compartment front panel.

2. A draw-out control compartment comprising:
a drawer housing having a front opening and an access lid;
a control component support structure received within said drawer housing and supported on drawer slides, said control component support structure having a front end and a rear end;
a control compartment front panel hingedly attached to said front end of said control component support structure; and
electrical control components secured to said control compartment front panel.

3. A draw-out control compartment comprising:
a drawer housing with a housing interior and having a drawer housing rear wall with an interior side and an exterior side, and being open opposite said drawer housing rear wall to define a front opening;
a cable storage compartment adjacent said drawer housing rear wall on said exterior side and opening into said housing interior through an aperture in said housing rear wall;
a control component support structure received within said drawer housing and supported on drawer slides, said control component support structure having a front end and a rear end;
a control component support structure front panel hingedly attached to said front end of said component support structure, with electrical control components secured to said control compartment front panel, and a control compartment rear wall attached to said rear end of said component support structure; and
a control cable attached to said control component support structure and extending into said cable storage compartment, said control cable having a length which permits said control component support structure to be pulled out of said drawer housing with said control cable remaining attached, with excess length of said control cable when said control component support structure is all the way within said drawer housing being stored within said cable storage compartment.

4. The draw-out control compartment of claim 3, wherein said cable storage compartment is located at a lower edge of said drawer housing rear wall and has a height sufficient to accommodate said control cable, but less than the height of said drawer housing rear wall.

5. The draw-out control compartment of claim 3, wherein said control component support structure is removable from and replaceable within said drawer housing.

6. The draw-out control compartment of claim 3, wherein said drawer housing is secured to and behind an equipment front panel having an aperture, said front opening of said drawer housing aligning with said aperture.

7. The draw-out control compartment of claim 3, wherein said drawer housing has an access lid.

8. Electrical equipment comprising:
a stationary frame;
a movable frame slidably carried on said stationary frame and having an equipment front panel;
an aperture in said equipment front panel;
a control compartment drawer housing having a control compartment drawer housing front opening, said control compartment drawer housing being secured behind said equipment front panel, said front opening of said control compartment drawer housing aligning with said aperture in said equipment front panel;
a control component support structure received within said control compartment drawer housing and supported on control component support structure drawer slides, said control component support structure having a front end and a rear end;
a control compartment front panel hingedly attached to said front end of said control component support structure; and
electrical control components secured to said control compartment front panel.

9. The electrical equipment of claim 8, which further comprises a control component structure rear wall attached to said rear end of said control component support structure.

10. The electrical equipment of claim 9, wherein:
said control compartment drawer housing has a control compartment drawer housing rear wall with an interior side and an exterior side; and which further comprises:
a cable storage compartment adjacent said control compartment drawer housing rear wall on said exterior side and opening into said housing interior through an aperture in said control compartment drawer housing rear wall; and
a control cable attached to said control component support structure and extending into said cable storage compartment, said control cable having a length which permits said control component support structure to be pulled out of said control compartment drawer housing with said control cable remaining attached, with excess length of said control cable when said control component support structure is all the way within said control compartment drawer housing being stored within said cable storage compartment.

11. The electrical equipment of claim 10, wherein said cable storage compartment is located near a lower edge of said control compartment drawer housing rear wall and has a height sufficient to accommodate said control cable, but less than the height of said control compartment drawer housing rear wall.

12. The electrical equipment of claim 8, wherein said control component support structure is removable from and replaceable within said control compartment drawer housing.

* * * * *